(12) United States Patent
Muckenschnabel et al.

(10) Patent No.: US 7,708,321 B2
(45) Date of Patent: May 4, 2010

(54) PIPE-CONNECTOR MOLDED PART FOR PRE-INSULATED PIPE CONDUITS

(75) Inventors: Harald Muckenschnabel, Singen (DE); Udo Heizmann, Donaueschingen (DE)

(73) Assignee: Georg Fischer Rohrleitungssysteme AG, Schaffhausen (CH)

( * ) Notice: Subject to any disclaimer, the term of this patent is extended or adjusted under 35 U.S.C. 154(b) by 115 days.

(21) Appl. No.: 10/513,188

(22) PCT Filed: May 16, 2003

(86) PCT No.: PCT/EP03/05145

§ 371 (c)(1), (2), (4) Date: Mar. 21, 2005

(87) PCT Pub. No.: WO03/104710

PCT Pub. Date: Dec. 18, 2003

(65) Prior Publication Data

US 2005/0156429 A1    Jul. 21, 2005

(30) Foreign Application Priority Data

Jun. 10, 2002  (DE) ................................ 102 25 802

(51) Int. Cl.
*F16L 21/00*    (2006.01)
(52) U.S. Cl. ...................... 285/397; 285/47; 285/370
(58) Field of Classification Search ................. 285/397, 285/370, 47; 138/111, 112, 113, 114, 117, 138/149
See application file for complete search history.

(56) References Cited

U.S. PATENT DOCUMENTS

| 1,188,485 | A | * | 6/1916 | Pruyn ........................ 285/27 |
| 1,762,766 | A | * | 6/1930 | De Garay ................... 285/331 |
| 2,980,568 | A | * | 4/1961 | Kazmierowicz ............. 138/147 |
| 3,387,864 | A | * | 6/1968 | Walters ........................ 285/23 |
| 3,402,731 | A | * | 9/1968 | Martin ....................... 137/375 |
| 3,463,691 | A |   | 8/1969 | Martin |
| 3,464,450 | A | * | 9/1969 | Steffenini ................... 138/113 |
| 3,521,913 | A | * | 7/1970 | Verhein et al. .............. 285/109 |
| 3,744,823 | A | * | 7/1973 | Muir et al. ................. 285/21.1 |
| 3,972,548 | A | * | 8/1976 | Roseen .................... 285/381.4 |
| 4,162,093 | A | * | 7/1979 | Sigmund ..................... 285/47 |
| 4,598,938 | A | * | 7/1986 | Boss et al. ............... 285/382.2 |

(Continued)

FOREIGN PATENT DOCUMENTS

CN    671 084    7/1989

(Continued)

OTHER PUBLICATIONS

Gieck, Kurt and Reiner Gieck, Engineering Formulas, 1997, McGraw-Hill, Inc. Seventh American edition, pp. Z4 and Z6.*

*Primary Examiner*—Michael P. Ferguson
*Assistant Examiner*—Jay R Ripley
(74) *Attorney, Agent, or Firm*—Bachman & LaPointe, P.C.

(57) ABSTRACT

A pipe-connector molded part for pre-insulated pipe conduits consisting of plastic, whereby the pipe conduit is pre-insulated with polyurethane foam and the pipe-connector molded part is positioned so that it can be connected to the internal wall of the pipe conduits to be connected by a method for connecting pre-insulated pipe conduits consisting of plastic by way of the molded part.

8 Claims, 2 Drawing Sheets

U.S. PATENT DOCUMENTS

| | | |
|---|---|---|
| 5,002,716 A | 3/1991 | Van Dijck |
| 5,282,652 A * | 2/1994 | Werner ........................ 285/55 |
| 5,456,502 A * | 10/1995 | Sharp ....................... 285/123.1 |
| 5,722,462 A * | 3/1998 | Dridi et al. .................. 138/149 |
| 2001/0048223 A1 * | 12/2001 | Campbell .................. 285/21.1 |

FOREIGN PATENT DOCUMENTS

| | | |
|---|---|---|
| DE | 89 10 407.2 | 12/1989 |
| DE | 296 17 559 | 3/1997 |
| DE | 197 07 176 | 8/2000 |
| DE | 197 23 594 | 10/2001 |
| FR | 2 501 826 | 9/1982 |
| WO | WO 93/16321 | 8/1993 |

* cited by examiner

PIPE-CONNECTOR MOLDED PART FOR PRE-INSULATED PIPE CONDUITS

BACKGROUND OF THE INVENTION

The invention relates to a pipe-connection molded part for pre-insulated pipe conduits of plastic material, the pipe conduit being pre-insulated with polyurethane foam.

In pipe conduit construction, in particular in applications in which good insulation of the medium relative to the environment is required, such as, for example, in pipe conduit systems for the transport of refrigerants, pre-insulated pipe conduit sections are being increasingly used. A readily suitable material for the insulation of refrigerant pipe conduits is foamed polyurethane. Arranged around the pipe conduit is an outer pipe or a tubular outer casing which is kept at a uniform distance from the outer wall of the pipe conduit concentrically around the pipe conduit by means of spacers. The annular space between the inner wall of the casing and the outer wall of the pipe conduit is completely filled with polyurethane foam. The polyurethane foam is injected as a reactive foam-forming liquid, and the foam produced hardens. The foam readily adheres to the surfaces of the pipe conduit and the outer casing and also gives the pipe conduit pre-insulated in this way greater rigidity.

If a plurality of such pipe conduit sections have to be connected to one another, the effort required for preparing and producing the pipe conduit connection is relatively large. The pipe conduit itself must be exposed, cleaned of foam and connected to the next pipe conduit section by means of a sleeve. The outer casing must be made continuous again by means of a heat-shrinkable tube around the connection point, and the annular intermediate space between outer casing and the point connected to the sleeve must be filled with new foam.

EP182604 B1 discloses an arrangement and a method for connecting pipe conduits pre-insulated with polyurethane foam. In the insulating material in the intermediate space between pipe conduit and outer casing, an annular space is formed at the connection point. A special annular element which shrinks under the action of heat is introduced in this annular space. The special element consists of a nickel-titanium alloy. After the shrink-fit operation, the annular element exerts such a high force on the connection point between the two pipe conduits that no further connection of the pipe conduits is necessary.

Instead of the special element, a commercially available sleeve or adhesive sleeve may also be used. To this end, the polyurethane foam must also be removed from the connection region before the connection is produced. In order to obtain a sound connection between sleeve and pipe, the outside of the inner pipe must be peeled with a special peeling implement and cleaned.

Based on the prior art, the object of the invention is to provide a pipe-connection molded part for pre-insulated pipe conduits which permits a medium-tight, cost-effective and environmentally safe connection between two pipe conduit sections at any desired point of the pipe conduit.

SUMMARY OF THE INVENTION

The foregoing object is achieved by providing a pipe-connection molded part for pre-insulated pipe conduits of plastic material, the pipe conduit being pre-insulated with polyurethane foam, and the pipe-connection molded part being arranged in such a way that it can be connected to the inner wall of the pipe conduits to be connected.

Preferred developments of the invention follow.

It is advantageous that no insulating material and no outer pipe material has to be removed and disposed of for the connection of the pipe conduit sections. This is achieved by the pipe conduit sections pre-insulated with polyurethane foam being arranged in the connection region in such a way that they can be pushed into position on a nipple matching the inside diameter of the inner pipes.

It is also advantageous that no additional preparatory effort and no tools, such as, for example, peeling tools for the outside of the inner pipe, are required for the connection. In the connection region, the inner surfaces of the pipe conduit and the nipple which are to be connected to one another are not treated by the insulating process or contaminated with foam residues.

It is also advantageous that, in the connection region between the pipe conduit and the pipe-connection molded part, the connecting conditions are matched to one another and can be reproduced. This is achieved by the pipe inside diameter and the nipple outside diameter being precisely definable in the connection region.

Overall, considerable material and time are saved by the connection on the inside of the inner pipe. The removal of the outer pipe and of the polyurethane foam, the environmentally compatible disposal of the polyurethane foam residues and the complicated cleaning of the outside, contaminated with polyurethane foam, of the inner pipe are dispensed with. It is not necessary to procure a special peeling implement for the outside of the inner pipe. The pipe conduit sections of the pipe conduits pre-insulated with polyurethane foam, which are relatively expensive, can be processed virtually without waste and losses.

BRIEF DESCRIPTION OF THE DRAWINGS

An exemplary embodiment of the invention is described with reference to the figures, wherein.

DETAILED DESCRIPTION

Figure 1:
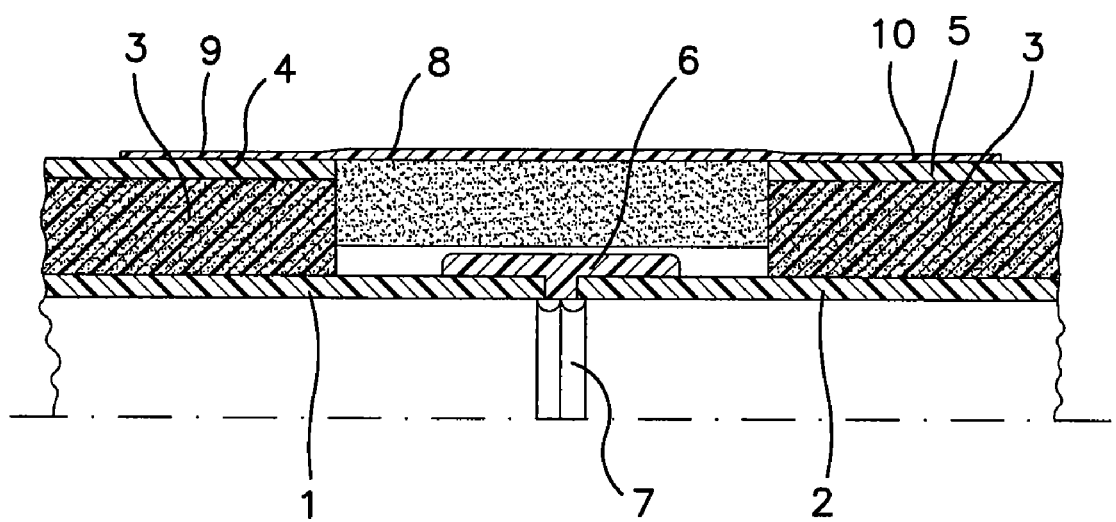
FIG. 1: shows a section through a prior art connection between two pipe conduit sections pre-insulated with polyurethane foam.

A known connection between two pipe conduits for temperature-sensitive media, for example for refrigerants in industrial cooling line systems, is shown sectioned in FIG. 1. The pipe conduits consist of an inner pipe 1, 2, are pre-insulated with a layer 3 of polyurethane foam and are encased with an outer pipe 4, 5. The inner pipes are made of an acrylonitrile-butadiene-styrene (=ABS) and the outer pipes are made of a high-density polyethylene (=HDPE). Polyurethane foam (=PUR) is best suited for cold insulation. The pipe conduit is connected in a conventional manner using an adhesive sleeve 6. The pre-insulated pipe conduits are obtainable in nominal diameters of 16 to 225 mm.

The prior art connection is produced as follows: the pipe conduits are severed in the connection region in order to expose the ends of the inner pipes 1, 2. The outer pipe 4, 5 and the polyurethane foam layer 3 are removed from the connection region. After the layer 3 has been removed, the outside of the inner pipe 1, 2 must be cleaned and prepared for the connection. The polyurethane foam forms a permanent connection with most surfaces. The outside of the inner pipe 1, 2 must be peeled with a special peeling implement. In the process, care must be taken to ensure that not too much material is removed, since otherwise a gap which is too large would be produced between the inner wall of the sleeve 6 and the outer wall of the inner pipe 1, 2, and this gap can only be connected correctly and in a medium-tight manner with difficulty.

After both pipe conduit sections have been prepared in this way, an adhesive connection or a welded connection to the sleeve 6 is produced. On the inside of the inner pipe, the adhesive forms a bead 7 at the point where the two inner pipes are pushed into the adhesive sleeve 6. Beads 7 of molten plastic material can also be produced during the "sleeve welding process". The space which is left between the sleeve 6 and the outer pipe 4, 5 is then filled again with polyurethane foam.

What are referred to as half shells, or half-ring-shaped elements of polyurethane foam, which are obtainable on the market are used for this purpose. The half shells have a length which corresponds to the length of the connection region. The length of each half shell is slightly greater than twice the length of the polyurethane foam layers 3 which have been removed at both pipe conduit sections in order to expose the ends for the adhesive bonding. Finally, the pipe connection point, by means of a heat-shrinkable tube 8 of polyethylene and a sealing agent or an adhesive tape 9, 10, is sealed off again against the ingress of air or moisture.

Figure 2:
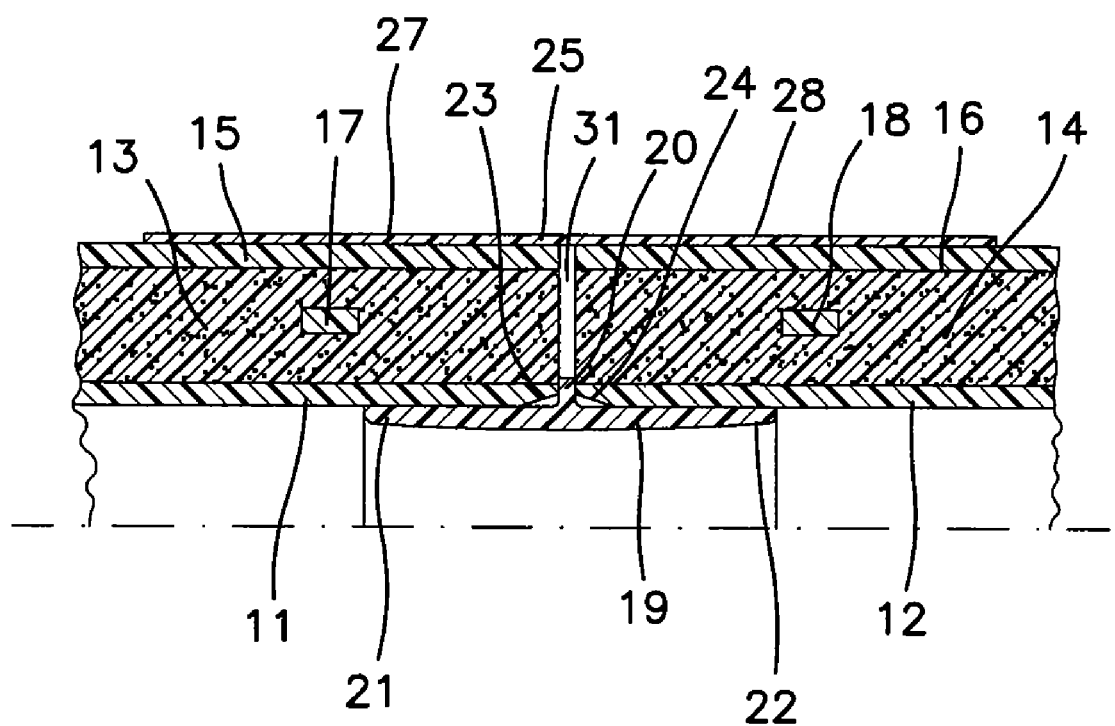
FIG. 2: shows a section through a connection between two pipe conduit sections pre-insulated with polyurethane foam and having a connector according to the invention.

A novel connection, in accordance with the present invention, between two pipe conduits for temperature-sensitive media, for example for refrigerants in an industrial cooling line system, is shown sectioned in FIG. 2. From the inside to the outside, the pipe conduits are composed of: an inner pipe 11, 12 of plastic, for example of an acrylonitrile-butadiene-styrene, a layer 13, 14 of insulating foam, for example polyurethane foam, and an outer pipe 15, 16, for example of high-density polyethylene. In order to keep the outer pipe 15, 16 at a uniform distance concentrically around the inner pipe 11, 12 during the introduction and curing of the polyurethane foam, plastic spacers 17, 18 are arranged between the inner pipe 11, 12 and the outer pipe 15, 16 at regular intervals in the longitudinal direction of the pipe conduit. The differences in diameter between the inner pipe and the outer pipe, which lead to intermediate spaces of different size for the foam layer 13, 14, are automatically compensated for through the use of the spacers 17, 18.

The connection between the two pipe conduits is produced by means of a nipple or connector 19 of plastic which can be connected to the plastic of the inner pipe 11, 12, that is to say it can be adhesively bonded or welded to said plastic of the inner pipe 11, 12, and is compatible with it. The nipple 19 can be made adhesive before being connected to the pipe conduits. To this end, either those surfaces of the nipple 19 and the inner pipes 11, 12 which are to be connected to one another are heated by a "sleeve welding process", or the surfaces to be connected are adhesively provided with a suitable adhesive. In the center, on the outer circumference of the nipple or connector, the nipple 19 has an annular web 20 which is directed radially outward and serves as a stop for the inner pipes 11, 12 during the connection. The web 20 ensures that both pipes 11, 12 are pushed sufficiently deep over the nipple 19. At the start and at the end, the nipple 19 has wall regions 21, 22 rounded off or beveled inward. This ensures that the flow of the refrigerant through the pipe conduit is hindered as little as possible and that the pressure loss in the pipe conduit on account of changes in diameter is kept as small as possible.

At the end, on the pipe inside, the inner pipes 11, 12 may be beveled with a "draw-in bevel" or be rounded off with a draw-in radius. In FIG. 2, the ends of the inner pipes 11, 12 have a bevel 23, 24, the "draw-in bevel 23, 24, directed obliquely inward. This ensures that the pipe conduits can be pushed into position on the nipple 19 as simply as possible. During the adhesive bonding, the bevel 23, 24 also serves to draw in excess material which is displaced when the pipe conduits are pushed onto the nipple 19. If the inside diameter of the inner pipes 11, 12 is too small in relation to the outside diameter of the nipple 19, the inner pipes 11, 12 must be calibrated beforehand, that is to say they must be given a matching inside diameter by a peeling or scraping operation.

Before the connecting operation, the pipe conduit sections are aligned with the pipe conduit axis as accurately as possible. If the pipe conduit sections are processed on site in shorter lengths than the lengths delivered by the manufacturer, a new bevel 23, 24 has to be made as single preparation at the interface. No material is removed from the insulating layer 13, 14 or from the outer pipe 15, 16. In all cases, it is not necessary to remove polyurethane foam or polyethylene if the nipple 19 is used. No polyurethane foam or polyethylene need be disposed of. The connection on the inside of the pipe 11, 12 is simpler, since no polyurethane residues have to be removed from the surface of the inner pipe 11, 12.

Before the connection is produced, a "heat-shrinkable tube" 25 is put loosely over one of the pipe conduits, that is to say a tube of plastic material which has been modified in such a way that it shrinks under the action of heat. After the curing of the connection between nipple 19 and the inner pipes 11, 12, the tightness of the connection is tested.

Due to the formation of the web 20, a gap 31 is produced in the region of the web 20 between the pipe conduits, that is to say between the insulating foam layers 13, 14 and the outer pipes 15, 16. This gap 31 can readily be inspected during a test for pressure tightness, which is carried out following the actual connecting operation and before the welding to the heat-shrinkable tube. During the pressure tightness test, it can be observed in the gap 31 whether medium is escaping from the inner pipe 11, 12 in the event of a leaky connection. If there were no gap 31, the escaping test medium would be absorbed by the insulating foam.

After the testing of the tightness of the connection between nipple 19 and the inner pipes 11, 12, an adhesive sealing tape or a sealing adhesive tape 27, 28 is wound around the ends of the outer pipes 15, 16 in the region of the nipple 19. In order to achieve better adhesion on the heat-shrinkable tube 25 and on the outer pipe 15, 16, the adhesive tape 27, 28 may be a double-sided adhesive tape. Sound sealing in the region of the heat-shrinkable tube 25 is necessary in order to retain the insulating properties of the insulating foam 13, 14 even after the connecting. The heat-shrinkable tube 25 is then shrunk to the diameter of the outer pipes 15, 16 by the action of heat in the connection region.

The invention claimed is:

1. A pipe assembly comprising a pipe connector connecting adjoining pre-insulated pipe conduits of plastic material, wherein the pre-insulated pipe conduits each comprise an inner wall and an outer wall, each wall having an inner surface and an outer surface, wherein the inner surface of the outer wall and the outer surface of the inner wall define therebetween an insulating space filled with an insulating material and the inner surfaces of the inner walls define a conduit for the flow of a media, the outer walls have outer surfaces, wherein the adjoining pre-insulated pipe conduits have outer wall terminal ends and inner wall terminal ends, the respective outer wall terminal ends and inner wall terminal ends of the adjoining pre-insulated pipe conduits are both substantially in a respective single plane, the pipe connector comprises a molded plastic part connected to the inner surfaces of the inner walls of the adjoining pipe conduits, the pipe connector includes a web having a width, wherein a portion of the terminal ends of the inner wall of each of the adjoining pre-insulated pipe conduits abut the web and the outer wall of each adjoining pre-insulated pipe conduits are separated from each other by the web axial width, an air gap free of any solid material between the outer walls and insulating material of the adjoining pipe conduits, wherein the gap has an axial width and the web has an axial width which is substantially equal to the gap axial width, and a tube fitted on the outer surfaces of the outer wall of the adjoining pipe conduits;

wherein the gap is present between the insulating material of the adjoining pre-insulated pipe conduits for inspecting for pressure tightness.

2. A pipe assembly comprising a pipe connector connecting adjoining pre-insulated pipe conduits of plastic material, wherein the pre-insulated pipe conduits each comprise an inner wall and an outer wall, each wall having an inner surface and an outer surface, wherein the inner surface of the outer wall and the outer surface of the inner wall define therebetween an insulating space filled with an insulating material and the inner surfaces of the inner walls define a conduit for the flow of a media, wherein the adjoining pre-insulated pipe conduits have outer wall terminal ends and inner wall terminal ends, the respective outer wall terminal ends and inner wall terminal ends of the adjoining pre-insulated pipe conduits are both substantially in a respective single plane, the pipe connector comprises a molded plastic part connected to the inner surfaces of the inner walls of the adjoining pipe conduits, the molded plastic part comprises a longitudinal portion connected to the inner surfaces of the inner walls and a web directed radially outward of the longitudinal portion, the web is formed on an outer circumference of the longitudinal portion and projects between the inner walls of the adjoining pipe conduits and serves as a stop for the respective inner wall terminal ends of the adjoining pipe conduits which abut the web while defining an axial air gap free of any solid material between the terminal ends of the outer walls and insulating material of the adjoining pipe conduits, wherein the gap has an axial width and the web has an axial width which is substantially equal to the gap axial width;

wherein the gap is present between the insulating material of the adjoining pre-insulated pipe conduits for inspecting for pressure tightness.

3. The pipe connector according to claim 2 or 1, wherein a plurality of spacers are located in each of the insulating spaces.

4. The pipe connector according to claim 2 or 1, wherein the insulating material is solid.

5. The pipe connector according to claim 2 or 1, wherein the insulating material is non-gaseous.

6. The pipe connector according to claim 2 or 1, wherein the insulating material is plastic.

7. The pipe connector according to claim 2 or 1, wherein the insulating material is a foam material.

8. The pipe assembly according to claim 2, wherein an inner circumference of at least one end of the longitudinal portion is formed with a beveled region.

* * * * *